(12) United States Patent
Diehl

(10) Patent No.: US 10,409,980 B2
(45) Date of Patent: Sep. 10, 2019

(54) REAL-TIME REPRESENTATION OF SECURITY-RELEVANT SYSTEM STATE

(71) Applicant: CrowdStrike, Inc., Laguna Niguel (CA)

(72) Inventor: David F. Diehl, Minneapolis, MN (US)

(73) Assignee: CrowdStrike, Inc., Irvine, CA (US)

( * ) Notice: Subject to any disclaimer, the term of this patent is extended or adjusted under 35 U.S.C. 154(b) by 0 days.

(21) Appl. No.: 13/728,746

(22) Filed: Dec. 27, 2012

(65) Prior Publication Data

US 2014/0189776 A1 Jul. 3, 2014

(51) Int. Cl.
| | |
|---|---|
| H04L 29/06 | (2006.01) |
| G06F 21/52 | (2013.01) |
| G06F 21/55 | (2013.01) |
| H04L 12/24 | (2006.01) |
| G06F 21/57 | (2013.01) |

(52) U.S. Cl.
CPC .............. *G06F 21/52* (2013.01); *G06F 21/55* (2013.01); *G06F 21/57* (2013.01); *H04L 41/145* (2013.01); *H04L 63/20* (2013.01)

(58) Field of Classification Search
CPC .......... G06F 21/52; G06F 21/54; G06F 21/55; G06F 21/57; H04L 41/145; H04L 63/20
See application file for complete search history.

(56) References Cited

U.S. PATENT DOCUMENTS

| | | |
|---|---|---|
| 6,088,804 A | 7/2000 | Hill et al. |
| 7,072,876 B1 | 7/2006 | Michael |
| 7,203,868 B1 * | 4/2007 | Evoy ................... G06F 11/3017 714/37 |
| 7,302,698 B1 * | 11/2007 | Proudler ................ G06F 21/57 713/187 |
| 7,478,237 B2 | 1/2009 | Costea et al. |
| 7,571,288 B2 | 8/2009 | Pudipeddi et al. |
| 7,765,400 B2 | 7/2010 | Costea et al. |

(Continued)

FOREIGN PATENT DOCUMENTS

| | | |
|---|---|---|
| JP | 2004510240 | 4/2004 |
| JP | 2006053788 | 2/2006 |

(Continued)

OTHER PUBLICATIONS

NPL Search (Google Scholar) (Year: 2019).*

(Continued)

*Primary Examiner* — Mahfuzur Rahman
*Assistant Examiner* — Richard W Cruz-Franqui
(74) *Attorney, Agent, or Firm* — Lee & Hayes, P.C.

(57) ABSTRACT

A situational model representing of a state of a monitored device is described herein. The situational model is constructed with the security-relevant information in substantially real-time as execution activities of the monitored device associated with the security-relevant information are observed. The represented state may include a current state and a past state of the monitored device. Also, the situational model may be used to validate state information associated events occurring on the monitored device. Further, a remote security service may configure the monitored device, including configuring the situational model, and may build an additional situational model representing a state of a group of monitored devices.

27 Claims, 5 Drawing Sheets

(56) References Cited

U.S. PATENT DOCUMENTS

| | | |
|---|---|---|
| 7,765,410 B2 | 7/2010 | Costea et al. |
| 8,065,728 B2 | 11/2011 | Wang et al. |
| 8,234,693 B2 | 7/2012 | Stahl et al. |
| 8,321,677 B2 | 11/2012 | Morten |
| 8,407,279 B2 | 3/2013 | Kang |
| 8,572,247 B2 | 10/2013 | Larson et al. |
| 8,577,616 B2 | 11/2013 | Dunlap |
| 8,762,298 B1* | 6/2014 | Ranjan et al. ............. 706/12 |
| 8,813,227 B2* | 8/2014 | Sallam ............... G06F 21/52 726/22 |
| 8,881,288 B1 | 11/2014 | Levy et al. |
| 2002/0123966 A1 | 9/2002 | Chu et al. |
| 2003/0084009 A1 | 5/2003 | Bigus |
| 2003/0097588 A1 | 5/2003 | Fischman et al. |
| 2004/0049698 A1 | 3/2004 | Ott et al. |
| 2004/0230834 A1 | 11/2004 | McCallam |
| 2005/0138110 A1 | 6/2005 | Redlich et al. |
| 2006/0174323 A1 | 8/2006 | Brown et al. |
| 2006/0272024 A1 | 11/2006 | Huang et al. |
| 2007/0022287 A1 | 1/2007 | Beck et al. |
| 2007/0028291 A1 | 2/2007 | Brennan et al. |
| 2007/0039047 A1 | 2/2007 | Chen et al. |
| 2007/0094496 A1 | 4/2007 | Burtscher |
| 2007/0143850 A1 | 6/2007 | Kraemer et al. |
| 2007/0174569 A1* | 7/2007 | Schnapp ............. G06F 3/0604 711/162 |
| 2007/0250817 A1 | 10/2007 | Boney |
| 2007/0261120 A1* | 11/2007 | Arbaugh ............. G06F 21/57 726/26 |
| 2008/0022359 A1* | 1/2008 | Gladstone ............. G06F 9/468 726/1 |
| 2008/0034429 A1 | 2/2008 | Schneider |
| 2008/0148398 A1 | 6/2008 | Mezack et al. |
| 2008/0189796 A1 | 8/2008 | Linn et al. |
| 2008/0209505 A1 | 8/2008 | Ghai et al. |
| 2008/0209517 A1 | 8/2008 | Nightingale et al. |
| 2008/0253287 A1 | 10/2008 | Gupta et al. |
| 2008/0282198 A1 | 11/2008 | Brooks et al. |
| 2008/0320561 A1 | 12/2008 | Suit et al. |
| 2009/0089860 A1* | 4/2009 | Forrester ............. H04L 63/12 726/3 |
| 2009/0199296 A1* | 8/2009 | Xie et al. ............. 726/23 |
| 2009/0216806 A1 | 8/2009 | Feuerstein et al. |
| 2009/0300769 A1 | 12/2009 | Srinivasa et al. |
| 2009/0328193 A1 | 12/2009 | Moore et al. |
| 2010/0031354 A1 | 2/2010 | Hudis et al. |
| 2010/0074446 A1 | 3/2010 | Fuchs et al. |
| 2010/0095374 A1 | 4/2010 | Gillum et al. |
| 2010/0100619 A1 | 4/2010 | Chang et al. |
| 2010/0169973 A1 | 7/2010 | Kim et al. |
| 2010/0235622 A1 | 9/2010 | Robinton et al. |
| 2010/0312890 A1 | 12/2010 | Bernosky |
| 2011/0029772 A1* | 2/2011 | Fanton ............. G06F 21/10 713/165 |
| 2011/0039237 A1 | 2/2011 | Skare |
| 2011/0072012 A1 | 3/2011 | Ah-Pine et al. |
| 2011/0099632 A1 | 4/2011 | Beck et al. |
| 2011/0138469 A1 | 6/2011 | Ye et al. |
| 2011/0209219 A1 | 8/2011 | Zeitlin et al. |
| 2011/0239306 A1 | 9/2011 | Avni et al. |
| 2011/0277034 A1 | 11/2011 | Hanson |
| 2012/0005542 A1* | 1/2012 | Petersen et al. ............. 714/48 |
| 2012/0079598 A1 | 3/2012 | Brock et al. |
| 2012/0137367 A1 | 5/2012 | Dupont et al. |
| 2012/0167161 A1 | 6/2012 | Kim |
| 2012/0240183 A1 | 9/2012 | Sinha |
| 2012/0246297 A1* | 9/2012 | Shanker et al. ............. 709/224 |
| 2012/0255003 A1* | 10/2012 | Sallam ............... G06F 21/554 726/23 |
| 2012/0255012 A1* | 10/2012 | Sallam ............... G06F 21/52 726/24 |
| 2012/0323853 A1* | 12/2012 | Fries ............... G06F 11/301 707/649 |
| 2012/0324236 A1* | 12/2012 | Srivastava ............. G06F 21/57 713/189 |
| 2013/0081134 A1 | 3/2013 | Glew et al. |
| 2013/0198847 A1 | 8/2013 | Sampigethaya |
| 2013/0246925 A1 | 9/2013 | Ahuja et al. |
| 2013/0291112 A1 | 10/2013 | Shue et al. |
| 2013/0304761 A1 | 11/2013 | Redlich et al. |
| 2013/0305356 A1 | 11/2013 | Cohen-Ganor et al. |
| 2013/0333040 A1* | 12/2013 | Diehl ............... G06F 9/46 726/24 |
| 2014/0007190 A1 | 1/2014 | Alperovitch et al. |
| 2014/0013432 A1 | 1/2014 | Yi |
| 2014/0053265 A1 | 2/2014 | Crowley |
| 2014/0109226 A1 | 4/2014 | Diehl et al. |
| 2014/0137243 A1 | 5/2014 | Reutter |
| 2014/0189776 A1 | 7/2014 | Diehl |
| 2014/0208420 A1 | 7/2014 | Mraz et al. |
| 2014/0237599 A1 | 8/2014 | Gertner et al. |
| 2014/0259170 A1 | 9/2014 | Amsler |
| 2014/0325656 A1* | 10/2014 | Sallam ............... G06F 21/52 726/24 |
| 2014/0380488 A1 | 12/2014 | Datta Ray et al. |
| 2015/0101044 A1 | 4/2015 | Martin et al. |
| 2015/0163121 A1 | 6/2015 | Mahaffey et al. |
| 2015/0295948 A1 | 10/2015 | Hassell et al. |
| 2015/0356301 A1 | 12/2015 | Diehl et al. |

FOREIGN PATENT DOCUMENTS

| | | |
|---|---|---|
| JP | 2010108469 | 5/2010 |
| JP | 2012168686 | 9/2012 |
| KR | 1020100085424 A | 7/2010 |
| KR | 101038048 | 6/2011 |
| WO | WO02103498 | 12/2002 |
| WO | WO2012107557 | 8/2012 |
| WO | WO2012135192 | 10/2012 |
| WO | WO2013164821 | 11/2013 |
| WO | WO2014020908 | 2/2014 |

OTHER PUBLICATIONS

PCT Search Report and Written Opinion dated Sep. 17, 2013 for PCT application No. PCT/US2013/040420, 12 pages.

PCT Search Report and Written Opinion dated Sep. 26, 2013 for PCT Application No. PCT/US13/40428, 13 pages.

King et al, "Backtracking Intrusions", ACM SOSP, Oct 2003, vol. 37, Issue 5, 14 pgs.

Office Action for U.S. Appl. No. 13/492,672, dated Apr. 7, 2014, David F. Diehl, "Kernel-Level Security Agent", 8 pages.

Office action for U.S. Appl. No. 13/538,439, dated Jun. 30, 2014, Alperovitch et al., "Social Sharing of Security Information in a Group", 13 pages.

PCT Search Report and Written Opinion dated Apr. 29, 2014 for PCT application No. PCT/US13/75856, 13 pages.

PCT Search Report and Written Opinion dated Apr. 28, 2015 for PCT application No. PCT/US2015/013522, 13 pages.

Final Office Action for U.S. Appl. No. 13/492,672, dated Oct. 23, 2014, David F. Diehl, "Kernel-Level Security Agent", 15 pages.

Final Office Action for U.S. Appl. No. 13/538,439, dated Dec. 2, 2014, Dmitri Alperovitch, "Social Sharing of Security Information in a Group", 13 pages.

Office Action for U.S. Appl. No. 13/538,439, dated Apr. 23, 2015, Dmitri Alperovitch, "Social Sharing of Security Information in a Group", 6 pages.

Office Action for U.S. Appl. No. 14/297,974, dated Jul. 9, 2015, David Frederick Diehl, "Real-Time Model of States of Monitored Devices", 18 pages.

PCT Search Report and Written Opinion dated Sep. 10, 2015 for PCT application No. PCT/US2015/033551, 14 pages.

Singapore Office Action dated Jan. 10, 2017 for Singapore Patent Application No. 11201504944T, a counterpart foreign application of U.S. Appl. No. 13/728,746, 6 pages.

Extended European Search Report dated Jul. 8, 2016 for European Patent Application No. 13867660.6, 6 pages.

(56) References Cited

OTHER PUBLICATIONS

Office action for U.S. Appl. No. 14/297,974, dated Apr. 14, 2016, Diehl et al., "Real-Time Model of States of Monitored Devices", 20 pages.
Office action for U.S. Appl. No. 14/297,974, dated Jul. 29, 2016, Diehl et al., "Real-Time Model of States of Monitored Devices", 16 pages.
Singapore Office Action dated Apr. 27, 2016 for Singapore Patent Application No. 11201504944T, a counterpart foreign application of U.S. Appl. No. 13/728,746, 8 pages.
Office Action for U.S. Appl. No. 14/297,974, dated Mar. 9, 2017, Diehl et al., "Real-Time Model of States of Monitored Devices", 17 pages.
Pingali, Keshav. "Application-Level Checkpoint-restart (CPR) for MPI Programs," p. 10. Oct. 25, 2006; 38 pages. Retrieved Sep. 22, 2017 from http://www.cs.utexas.edu/users/moore/acl2/seminar/2006.10.25-pingali/acl2.pdf.
Singapore Office Action dated Jun. 28, 2017 for Singapore patent application No. 11201504944T, a counterpart foreign application of U.S. Appl. No. 13/728,746, 7 pages.
Translated Israeli Office Action dated Mar. 18, 2018 for Israeli patent application No. 239567, a counterpart foreign application of U.S. Appl. No. 13/728,746, 12 pages.
European Office Action dated Dec. 21, 2017 for European patent application No. 13867660.6, a counterpart foreign application of U.S. Appl. No. 13/728,746, 5 pages.
Extended European Search Report dated Dec. 5, 2017 for European Patent Application No. 15802626.0, 10 pages.
Japanese Office Action dated Nov. 21, 2017 for Japanese patent applicatiopn No. 2015-550476, a counterpart foreign application of U.S. Appl. No. 13/728,746, 15 pages.
Li, et. al., "Research on the Aggregation Model of Network Security Situation Awareness Based on Analytic Hierarchy Process", 2013 Fourth International Conference on Intelligent Systems Design and Engineering Applications, IEEE, Nov. 6, 2013, pp. 519-522.
Li, et. al., "The Research on Nework Security Visualization Key Technology", Multimedia Information Networkign and Securitu (MINES), 2012 Fourth International Conference on, IEEE, Nov. 2, 2012, pp. 983-988.
Pingali, Keshav, "Application-Level Checkpoint-restart (CPR) for MPI Programs," p. 10, Oct. 25, 2006; 38 pages.
Zhicai, et. al., "A Novel Distributed Intrusion Detection Model Based on Mobile Agent", Information Secutiy, ACM, Nov. 14, 2004, pp. 155-159.
Translated Office Action from the Japanese Patent Office for Patent Application No. 2016-571189, dated Apr. 2, 2019, a counterpart of U.S. Pat. No. 9,798,882, 5 pages.

\* cited by examiner

REAL-TIME REPRESENTATION OF SECURITY-RELEVANT SYSTEM STATE

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To meet the threats posed by these security exploits, a number of tools capable of retrospective analysis of system performance and state have been developed. For example, the BackTracker tool described in "Backtracking Intrusions" by Samuel T. King and Peter M. Chen (*ACM SIGOPS Operating Systems Review—SOSP '03*, Volume 37, Issue 5, December 2003, pgs. 223-236) automatically identifies potential sequences of steps that occurred in an intrusion by analyzing a comprehensive log of system activities and data. While such tools can detect security exploits and their manners of operation, they can only operate retrospectively and thus place those attacked at a disadvantage, always one step behind the attacker. The reason these tools can only operate retrospectively is the enormous computational cost of building the comprehensive log of system activities and data that is needed by the tools. In fact, the computational cost of writing events to the log is often higher than the cost of the events themselves. Each event may be written multiple times and writes to the logs often must cross input/output boundaries.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a situational model representing security-relevant state of a monitored device. The situational model is constructed with security-relevant information in substantially real-time as execution activities of the monitored device associated with the security-relevant information are observed. The security-relevant information includes information in the scope of a configuration of the situational model that represents a change of state. The represented security-relevant state may include a current state and a past state of the monitored device. Also, the situational model may be used to validate state information associated with execution activities. Both the constructing of the situational model and the querying of the situational model to validate state information may be performed by one or more modules of the monitored device, the modules and situational model comprising components of a kernel-level security agent. Further, the situational model may serve as a cache of information received from a remote security service, of information that is computationally expensive to generate or fetch, or of information that is high-latency to fetch.

In various embodiments, a remote security service may configure the monitored device, including configuring the situational model and the one or more modules, and may build an additional situational model representing security-relevant state of a group of monitored devices. The remote security service may build the additional situational model using security-relevant information received from the monitored devices. The monitored devices may provide the security-relevant information responsive to the configuration received from the remote security service. Further, in some embodiments, the configuring may be performed by the remote security service and the building of the additional situational model may be performed by an intermediate device of a client network that includes at least a part of the monitored devices. In such embodiments, the additional situation model may represent a state of the monitored devices of the client network.

In further embodiments, the remote security service or the kernel-level security agent may utilize information stored in the situational model but no longer present on a host operating system of a monitored device. This information may be about earlier processes or files in a chain of execution that led to an observable behavior of the monitored device. For example, a maliciously crafted document crashes a legitimate application and runs attack code in its place. The attack code launches a script which launches a new copy of the legitimate application, thus giving the appearance that the legitimate application did not crash. This historical information may be used by the remote security service or kernel-level security agent, for instance, in further analysis or in determining a responsive action.

Figure 1:
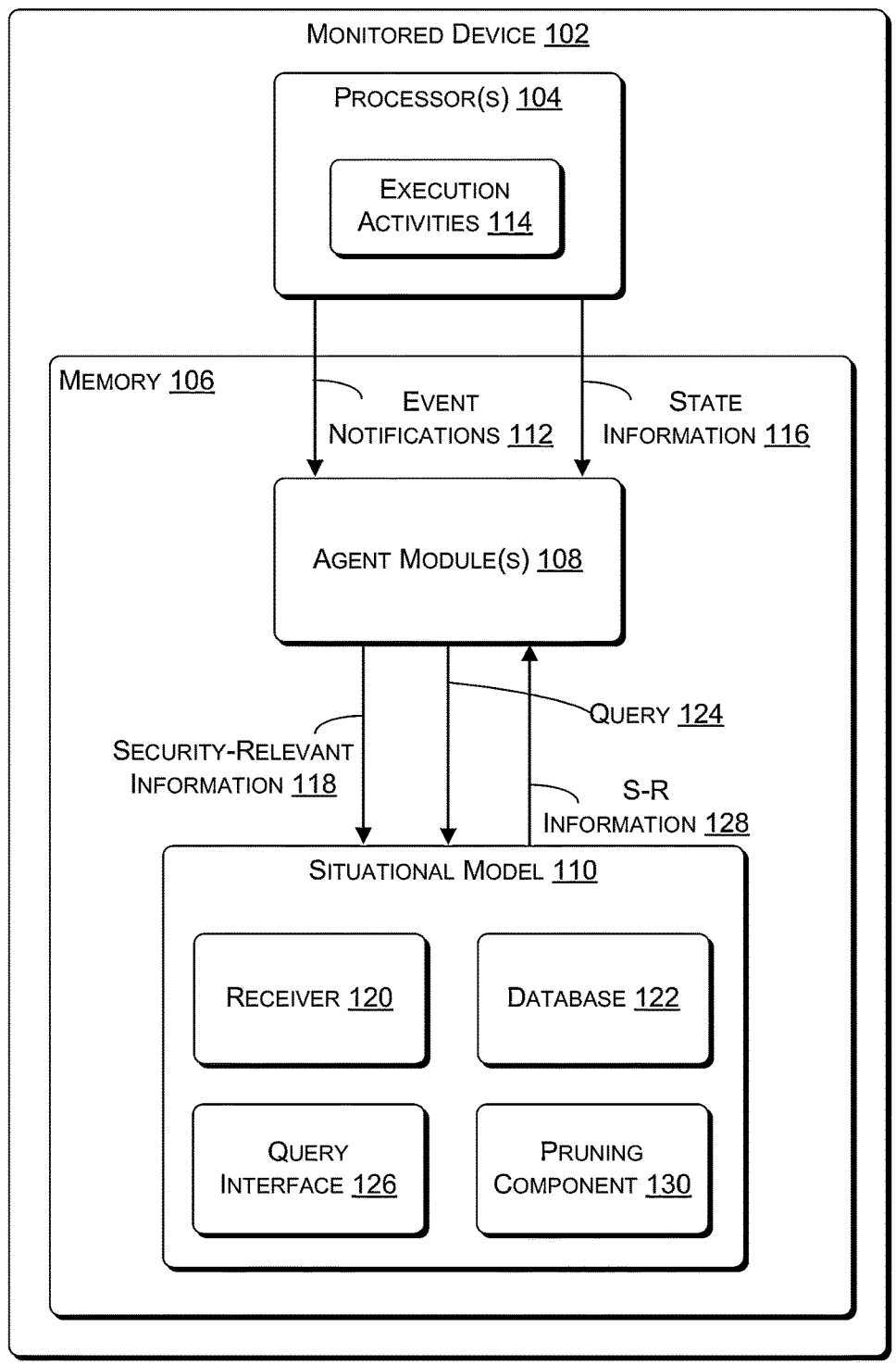
FIG. 1 illustrates an example situational model for representing in substantially real-time a security-relevant state of a monitored device and agent modules for building the situational model and for utilizing the situational model to validate state information.

FIG. 1 illustrates an example situational model for representing in substantially real-time a security-relevant state of a monitored device and agent modules for building the situational model and for utilizing the situational model to validate state information. As illustrated, the monitored device 102 may include one or more processors 104 and memory 106 storing agent module(s) 108 and a situational model 110. The agent module(s) 108 may receive notifications of events 112 included in or generated by execution activities 114 of the processor(s) 104. For at least some types of events 112, the agent module(s) 108 may retrieve state information 116 associated with the execution activities 114. The agent module(s) 108 may then utilize the events 112 and/or state information 116 to build the situational model 110, providing those events 112 and/or state information 116 to the situational model 110 as security-relevant information 118. The situational model 110 may include a receiver 120 to receive the security-relevant information 118 and store it in a database 122 of the situational model 110. In this manner, the agent module(s) 108 and situational model 110 may build the situational model 110 into a representation of current and past system states. In some embodiments, the agent module(s) 108 may also query 124 the situational model 110 using a query interface 126 of the situational model 110, the query interface 126 enabling retrieval of security-relevant information 128. The agent module(s) 108 may then utilize the security-relevant information 128 to validate additional state information 116. Also, to control the size of the situational model 110 while retaining important security-relevant information 118, the situational model 110 may include a pruning component 130 to selectively delete security-relevant information 118 based on configuration.

Figure 3:
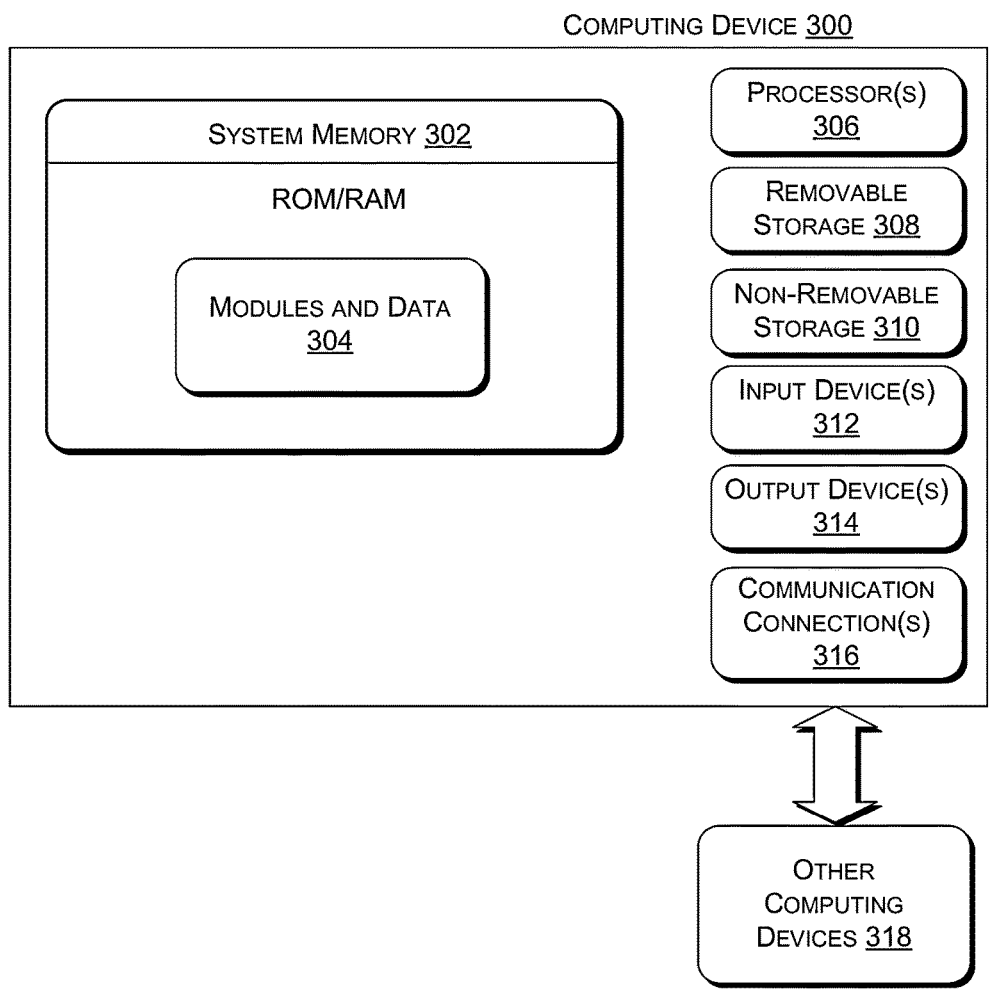
FIG. 3 illustrates a component level view of a computing device capable of acting as a security service device, a monitored device, or an intermediate device.

In various embodiments, the monitored device 102 may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the monitored device 102 may distribute the agent module(s) 108 and situational model 110 among the multiple computing devices. In some implementations, the monitored device 102 represents one or more virtual machines implemented on one or more computing devices. An example computing device capable of serving as a monitored device 102 is illustrated in FIG. 3 and described below with reference to that figure.

Also, in some embodiments, the monitored device 102 may belong to a client or client network that subscribes to a security service provider for security services. The monitored device 102 may thus be connected to the remote security service via a network. Through such a network, the monitored device 102 may receive an initial installation of agent module(s) 108 and situational model 110 and may receive configuration updates at various times. The monitored device 102 may also provide security-relevant information 118 and notifications to the remote security service based on triggers included in the configuration received from the remote security service.

In various embodiments, the processor(s) 104 is a central processing unit (CPU), a chipset component, a graphics processing unit (GPU), another processing unit or component known in the art, or any combination of processing units. The execution activities 114 of the processor(s) 104 may be any active processes, mutexes, etc. currently being executed by the processor(s) 104.

In various embodiments memory 106 is volatile (such as RAM), non-volatile (such as ROM, flash memory, etc.) or some combination of the two. The memory 106 may further be any tangible removable or non-removable media implemented in any method or technology for storage of information, such as computer readable instructions, data structures, program modules, or other data. Examples of memory 106 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by the monitored device 102.

In various embodiments, the agent module(s) 108 may be one or more modules of a kernel-level security agent. Such a kernel-level security agent may include event consumers that receive notifications of events 112 associated with execution activities 114, filters, an event bus that route events 112 to other ones of agent module(s) 108, correlators that track types of events 112, actors that gather state information 116 and act upon events 112, and a situational model 110. The kernel-level security agent may be installed by and configurable by a remote security service, receiving, and applying while live, reconfigurations of agent module(s) 108 and situational model 110. An example kernel-level security agent is described in greater detail in U.S. patent application Ser. No. 13/492,672, entitled "Kernel-Level Security Agent" and filed on Jun. 8, 2012.

In some embodiments, the agent module(s) 108 include event consumers, and the event consumers may be configured to listen for notifications of events 112. The types of events 112 listened for may be specified by configuration received from a remote security service. The event consumers may then provide the events 112 to an event bus through one or more filters, the filters selectively relaying the events 112 from the event consumers to the event bus based on the received configuration. Filters and the event bus may then provide the events 112 one or more of a correlator, an actor, or to the situational model 110. The filters and event bus may instead or additionally provide the events 112 to a remote security service. Besides receiving events 112 from the event consumers, the filters and event bus may receive configurations and security-relevant information 118 from the remote security service. This information/configuration may be provided to other agent module(s) 108 (e.g., actors) and/or may be cached in the situational model 110.

Correlators may track specific types of events whose occurrence, e.g., in a certain aggregate, is specified to be security-relevant information 118 by the received configuration. Once the correlators determine that one or more received events 112 constitute security-relevant information 118, the correlators provide the security-relevant information 118 to the receiver 120 of the situational model 110.

Actors may participate in building the situational model 110, in utilizing the situational model 110 to validate state information 116, and in utilizing the situational model 110 as a cache. Upon receiving events 112 from filters and the event bus, the actors may determine, based on the configuration received from the remote security service and on the type of the event whether to retrieve state information 116 from the execution activities 114 that include or generated the event 112. Such state information 116 may comprise a copy of a process, information drawn from a memory of the process, contents of a call stack associated with that process, data written or read by that process, etc. The actors may then provide one or both of the events 112 and state information 116 to the receiver 120 of the situational model 110.

In some embodiments, in addition to or in place of providing state information 116 to the situational model 110, the actors may query 124 the query interface 126 of the situational model 110 for query results, such as security-relevant information 128, and may utilize the query results to validate the state information 116. Validation may simply comprise a comparison of the state information 116 to the security-relevant information 128 (which may comprise state information from a prior point or points in time) to determine if there is a difference. In other embodiments, validation may comprise a more complex analysis of query results and state information 116. In response to a negative result (e.g., the state information 116 not matching the security-relevant information 128), the actors generate a validation error. Responsive to a validation error, the actors may respond in a number of ways. For example, the actors may perform at least one of reporting the event 112 and/or state information 116 associated with the validation error to a remote security service, alerting a user of the monitored device 102, taking an action to heal/remediate (e.g., halting the process associated with the validation error), or noting the validation error in the situational model 110 and performing further monitoring.

In further embodiments, actors may receive configurations, externally derived metadata about object represented in the situation model 110, or other information from a remote security service and may provide those configurations, metadata, or information to the situational model 110 through the receiver 120, the situational model 110 serving as a cache of the configurations or information. Additionally, the actors may provide other information that is computationally expensive to generate or fetch, or that is high-latency to fetch, to the situational model 110. Such information may be identified by the configuration of the agent modules 108 and/or situational model 110.

In various embodiments, the situational model 110 represents current and past states of the monitored device 102. The past states maintained include at least a subset of past states, such as states that enhance forensic and policy understanding of the current state. As described above, the situational model 110 may have at least three roles. In a first role, the situational model 110 may serve as a historian, providing access to past states of the monitored device 102 that are no longer stored elsewhere on the monitored device 102. In a second role, the situational model 110 may service as a validator, maintaining an independent model of the state of the monitored device 102 that can be used to detect malicious modifications of the host operating system state storage of the monitored device 102. Thus, even when the act of modification is not detected, its effects may be through comparison of current state to the independently maintained state in the situational model 110. In a third role, the situational model 110 provides a cache of configuration, information, and state that are received from a remote security service, that are computationally expensive to generate or fetch, or that are high-latency to fetch.

In some embodiments, the receiver 120 receives security-relevant information 118, such as events 112 and/or state information 116 from filters, correlators, or actors of the agent modules 108 and updates the database 122 with the received security-relevant information 118. To receive the security-relevant information 118, the receiver 120 may implement an event receiver interface on the above-mentioned event bus of the agent modules 108. In some embodiments the receiver 120 may inform the agent modules 108 of an inconsistency between received security-relevant information 118 and security-relevant information 118 stored in the database 122. The receiver 120 may also generate an event to provide to a remote security service, such as initializing a backup of the database 122. Further, the receiver 120 may generate any number of events based on received security-relevant information 118 and on security-relevant information 118 stored in the database 122. Such events may be provided to a remote security service or used to drive local actions.

In various embodiments, the database 122 may be any sort of database, file, or collection of data capable of storing information. The database 122 is a store with a configurable set of collections, such as tables. Each collection may represent a type of object about which the database 122 stores data (i.e., in the form of security-relevant information 118) and may be indexed by an identifier for that object class. Each collection for a type of object may include an index field, modeled data attributes (e.g., security-relevant information 118), and metadata defining a trust period for the collection. Each collection may also include one or more sub-collections, such as a sub-collection listing the loaded modules of a process. Such metadata may include the last "epoch" in which the collection data was written, and a mask (e.g., a bitmask) of attributes written in that epoch. As used herein, the term "epoch" may refer to a period of time in which all data acquired about a collection has consistent properties of liveness and trustworthiness. For ephemeral objects, epochs occur at system boot, when the kernel-level security agent restarts, or following rundown on an initial installation of a kernel-level agent. For persistent objects, an epoch occurs whenever mount of a backing store associated with the persistent objects is lost. Collections are also associated with a trust period, which defines the most recent epoch for which the collection can be trusted as an accurate representation. If the last epoch matches a current epoch, then all collection attributes set in the bitmask are within the trust period, and other collection attributes not set in the bitmask may be outside of the trust period. For example, the trust period for ephemeral objects is the current epoch. For persistent objects, the trust period may be the current epoch or a past epoch.

The types of objects about which the database 122 stores security-relevant information 118 may be specified by a configurable schema, the configurable schema and configuration updates to the configurable schema being received from the remote security service. For each object type, the schema may also include a flag indicating whether a collection is persistent or ephemeral. An ephemeral object may be any object that exists only in system memory (e.g., random access memory). Such an ephemeral object will not itself survive a reboot, although the corresponding representation of the object in the database 122 may survive the reboot, depending on configuration. Examples of ephemeral objects include processes, threads, etc. Persistent objects are any objects which have a backing store (e.g., are stored in permanent storage). Examples of persistent objects include files and the BIOS.

In various embodiments, the query interface 126 may be an interface used by filters, actors, correlators, other agent modules 108, or the remote security service to access the database 122 via queries 124. The query interface 126 may support two types of queries 124. The first type of query 124 may be a query requesting only security-relevant information 128 that is within the trust period. The second type of query 124 may be for all security-relevant information 128. In response to the query 124, the query interface 126 may return query results with flags indicating whether or not all of the returned security relevant information 128 is within the trust period and whether or not the trust period reaches back to a specific event, such as a reboot or a mounting of a file system. In further embodiments, the query interface 126 may support concurrent reading from and writing to the database 122.

In some embodiments, the pruning component 130 maintains the database 122, including pruning security-relevant information 118 from the database 122. The situational model 110 may include the pruning component 130 to ensure that the database 122 does not exceed a threshold size limit. The threshold size limit may be determined, for example, by the configuration received from the remote security service. The pruning component 130 may be configured to prune any security-relevant information 118 that is no longer needed to satisfy a query 124. The pruning component 130 may also assign different classifications and degrees of importance to different queries 124. This enables pruning of security-relevant information 118 needed to answer a low priority query when pruning of security-relevant information 118 no longer needed for any query 124 fails to sufficiently reduce the size of the database 122.

In pruning security-relevant information 118, the pruning component 130 may prune by collection, by record, or by attribute. In some embodiments, the pruning component 130 may use collection-based pruning for ongoing maintenance of the database 122 and attribute-based pruning responsive to high storage conditions. Collection-based pruning may involve pruning any collections representing ephemeral objects from previous epochs, as those ephemeral objects are no longer on the system. The collection-based pruning may, however, retain collections representing ephemeral objects when those ephemeral objects are referenced by persistent objects.

Example Network

Figure 2:
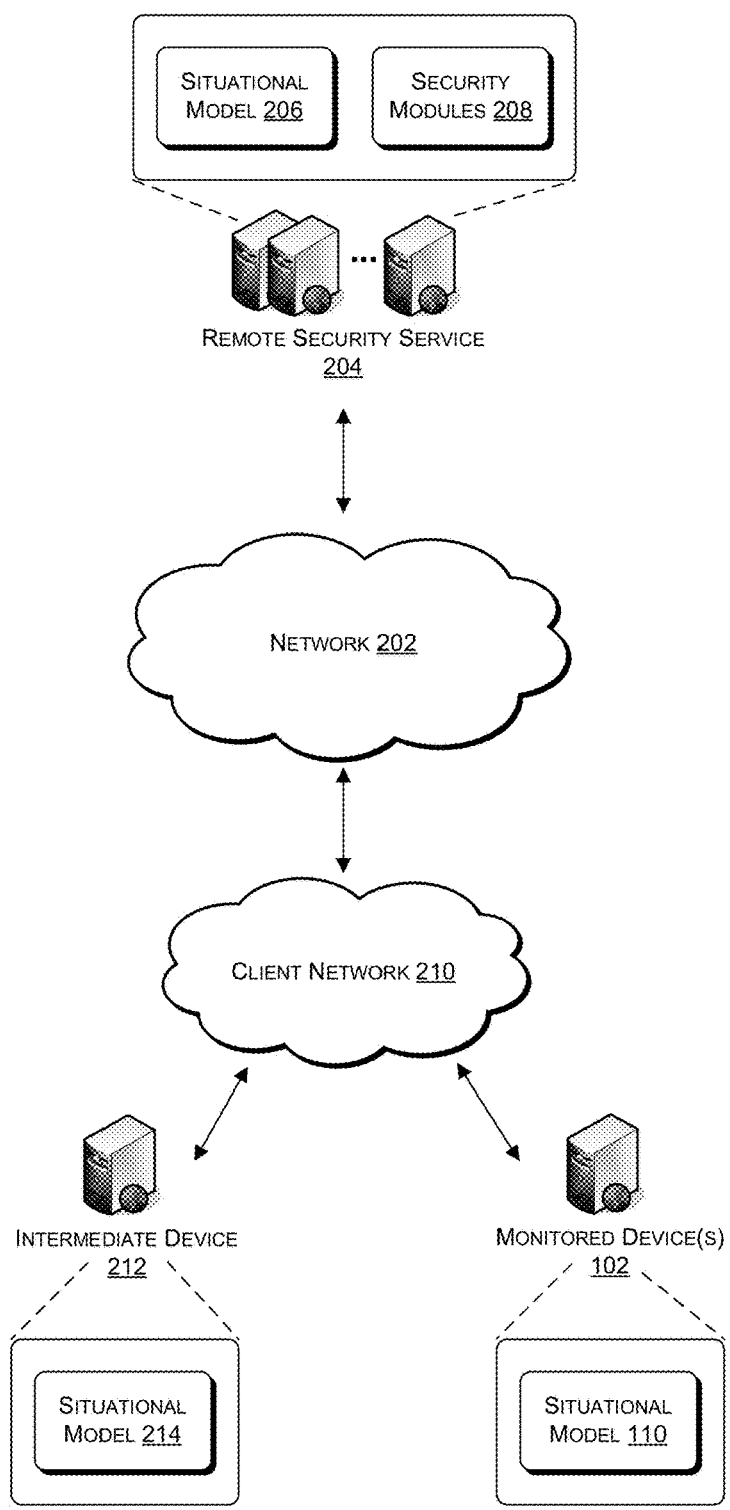
FIG. 2 illustrates example networks connecting monitored device(s) of a client network to a remote security service and to an intermediate device of the client network, each of the remote security service, the intermediate device, and the monitored device(s) being capable of building and maintaining a situational model.

FIG. 2 illustrates example networks connecting monitored device(s) of a client network to a remote security server and to an intermediate device of the client network, each of the remote security service, the intermediate device, and the monitored device(s) being capable of building and maintaining a situational model. As illustrated in FIG. 2, a network 202 connects monitored device(s) 102 to a remote security service 204. The remote security service 204 may include a situational model 206 representing states of the monitored device(s) 102 and security modules 208. In some embodiments, the monitored device(s) 102 may be connected to the network 202 through a client network 210, the client network 210 being associated with a client subscribing to the services of the remote security service 204. The client network 210 may also include an intermediate device 212 that maintains a situational model 214 specific to the client.

In some embodiments, the network 202 and client network 210 may each include any one or more networks, such as wired networks, wireless networks, and combinations of wired and wireless networks. Further, the network 202 and client network 210 may include any one or combination of multiple different types of public or private networks (e.g., cable networks, the Internet, wireless networks, etc.). For example, the network 202 may be a public network and the client network 210 may each be a private network. In some instances, computing devices communicate over the network 202 and client network 210 using a secure protocol (e.g., https) and/or any other protocol or set of protocols, such as the transmission control protocol/Internet protocol (TCP/IP).

In various embodiments, the devices implementing the remote security service 204 and the intermediate device 212 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the devices implementing the remote security service 204 represent a plurality of computing devices working in communication, such as a cloud computing network of nodes. When implemented on multiple computing devices, the remote security service 204 may distribute the modules and data 206-208 of the remote security service 204 among the multiple computing devices. In some implementations, one or more of the devices implementing the remote security service 204 and the intermediate device 212 represent one or more virtual machines implemented on one or more computing devices. An example computing device capable of serving as a device implementing the remote security service 204 or the intermediate device 212 is illustrated in FIG. 3 and described below with reference to that figure.

In various embodiments, the remote security service 204 may be a provider of information security services to individual users and client entities, such as maintenance and configuration of the agent modules 108 and situational model 110, threat modeling, and/or remediation. The security modules 208 of the remote security service 204 may be configured to perform such information security services.

In further embodiments, the remote security service 204 may build and maintain a situational model 206 representing states of a group of monitored devices 102. Such states may include current states, past states, or both. The remote security service 204 may receive security-relevant information 118 used to build the situational model 206 from the monitored devices 102 responsive to a configuration of those monitored devices 102. Such security-relevant information 118 may be received in substantially real time as the execution activities 114 associated with the security-relevant information 118 are observed. The security modules 208 may configure the monitored devices 102, specifying what security-relevant information 118 the monitored devices 102 are to provide to the remote security service 204. Such security-relevant information 118 may be information that, in isolation on a single monitored device 102 may or may not meaningful, but when received from multiple monitored devices 102 is meaningful. For instance, if a single monitored device 102 is connected to a third party system, then that connection may or may not be meaningful. However, if twelve monitored devices 102 are connected to that third party system, that aggregate of connections may indicate malicious activity.

The situational model 206 may include analogs for some or all of the above-described receiver 120, the database 122, the query interface 126, and the pruning module 130, or may include variants thereof. Thus, the description of the situational model 110 and its subcomponents may be partly or entirely applicable to the situational model 206. Upon receiving the security-relevant information 118, the security modules 206 or other logic of the remote security service 204 may store the security-relevant information 118 in the situational model 206.

In addition to storing security-relevant information 118, the situational model 206 may also support validation activities and security decisions. To support these activities and decisions, the situational model 206 may be queried. Such queries may be made by the security modules 208, by user-operators of the remote security service 204, or by other logic of the remote security service 204. The queries may be received by a query interface of the situational model 206, which may be an analog or variant of the query interface 126. The query interface of the situational model 206 may retrieve and return the sought security-relevant information 118. Those query results may then be used in validating other security-relevant information 118 received from the monitored devices 206 or in making security decisions. Such security decisions may include determining whether to generate a configuration update for one or more of the monitored devices 102, whether to alert one or more of the monitored devices 102 of malicious activity, whether to continue monitoring the one or more monitored devices 102 before taking further action, or whether to take a remediation action, such as halting a process. The security modules 208 may then act upon such a security decision.

In further embodiments, the situational model 206 may serve as a backup of situational models 110 of monitored devices 102. The remote security service 204 may receive at least a part of a situational model 110 periodically and may store that part in the situational model 206. Such delayed, periodic backup may avoid the overhead of using the situational model 206 as a real-time backup of the situational models 110.

In some embodiments, the remote security service 204 may also provide social aspects to the security services, forming groups of those users and/or client entities and automatically sharing security information among the users and/or client entities constituting a group.

In various embodiments, the monitored devices 102, intermediate device 212, and client network 210 may be associated with an entity, such as a business, government, or other organization, or may be associated with a single user or groups of users. That entity or those user(s) may subscribe for security services with the remote security service 204, which may monitor activities on monitored devices 102 of the entity/user(s). In some embodiments, that monitoring may involve installing agent modules 108 and situational model 110 on the monitored devices 102 to monitor execution activities 114 of the monitored devices 102 and to provide security-relevant information 118 to the remote security service 204.

The intermediate device 212 may be any sort of device configured to maintain a situational model 214 representing states of monitored devices 102 of the client. Such a situational model 214 may be like the situational model 206, but specific to a client. In some embodiments, the security modules 208 may build and query the situational model 214 in similar manner to its building and querying of the situational model 206.

Example System

FIG. 3 illustrates a component level view of a computing device capable of acting as a security service device, a monitored device, or an intermediate device. As illustrated, computing device 300 comprises a system memory 302 storing modules and data 304. Also, computing device 300 includes processor(s) 306, a removable storage 308 and non-removable storage 310, input device(s) 312, output device(s) 314 and communication connections 316 for communicating with other computing devices 318.

In various embodiments, system memory 302 is volatile (such as RAM), non-volatile (such as ROM, flash memory, etc.) or some combination of the two. The modules or data 304 stored in the system memory 302 may comprise methods, threads, processes, applications or any other sort of executable instructions, such as the instructions utilized to perform the operations of the monitored device(s) 102, remote security service 204, or intermediate device 212. The modules and data 304 may also include files and databases.

In some embodiments, the processor(s) 306 is a central processing unit (CPU), a graphics processing unit (GPU), or both CPU and GPU, or other processing unit or component known in the art.

Computing device 300 also includes additional data storage devices (removable and/or non-removable) such as, for example, magnetic disks, optical disks, or tape. Such additional storage is illustrated in FIG. 3 by removable storage 308 and non-removable storage 310. Tangible computer-readable media may include volatile and nonvolatile, removable and non-removable media implemented in any method or technology for storage of information, such as computer readable instructions, data structures, program modules, or other data. System memory 302, removable storage 308 and non-removable storage 310 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 300. Any such tangible computer-readable media may be part of the computing device 300.

Computing device 300 also has input device(s) 312, such as a keyboard, a mouse, a touch-sensitive display, voice input device, etc., and output device(s) 314 such as a display, speakers, a printer, etc. These devices are well known in the art and need not be discussed at length here.

Computing device 300 also contains communication connections 316 that allow the computing device 300 to communicate with other computing devices 318, such as others of the monitored device(s) 102, device(s) the remote security service 204, or the intermediate device 212.

Example Processes

Figure 4:
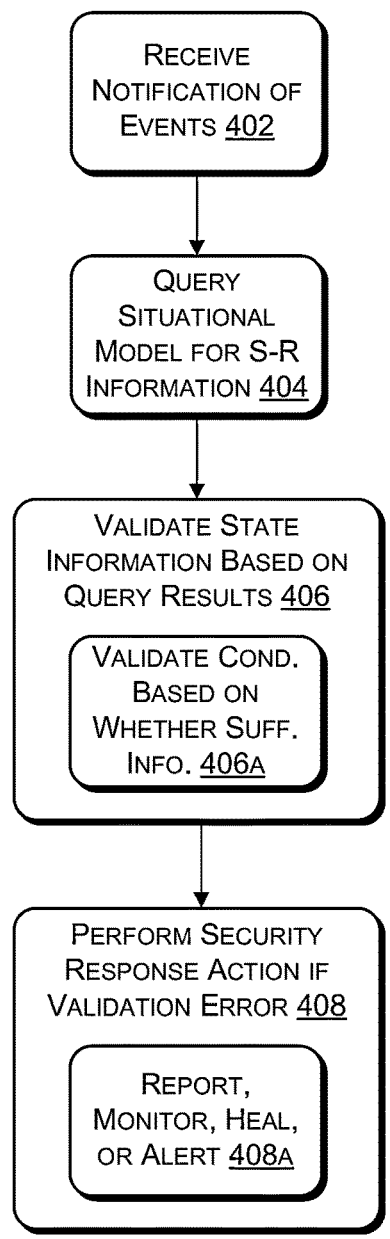
FIG. 4 illustrates an example process for validating, by a monitored device, state information based on security-relevant information stored by a situational model.
Figure 5:
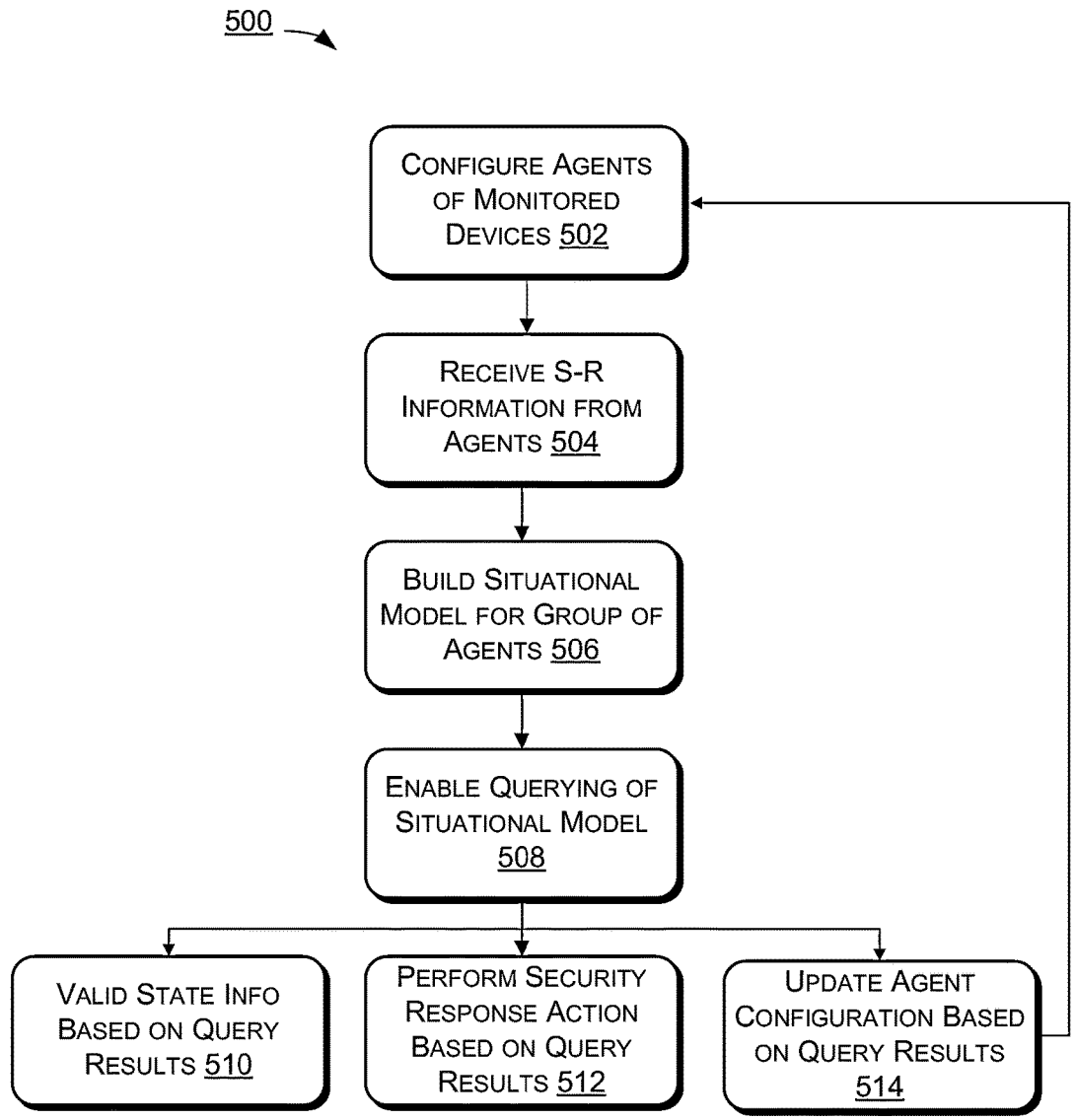
FIG. 5 illustrates an example process for building, by a remote security service, a situational model of security-relevant state for a group of monitored devices.

FIGS. 4 and 5 illustrate example processes 400 and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for validating, by a monitored device, state information based on security-relevant information stored by a situational model. In some embodiments, the monitored device includes a kernel-level security agent configured to perform at least a part of the process 400.

The process 400 includes, at 402, receiving, by a monitored device, a notification of an event associated with execution activities of the monitored device.

At 404, the monitored device queries a situational model for security-relevant information based at least in part on the notification, the situational model being a substantially real-time representation of a state of the monitored device constructed from security-relevant information.

At 406, the monitored device validates state information associated with the event based at least in part on the security-relevant information. At 406a, the validating is performed conditionally based on whether the state information is fully represented in the situational model.

At 408, when a result of the validating is a validation error, the monitored device performs at least one security response action. At 408a, the security response action is one of reporting the validation error to a remote security service, monitoring further execution activities, taking a remediation action directed at malicious activity that is responsible for the validation error, or alerting a user of the monitored device.

FIG. 5 illustrates an example process for building, by one or more computing devices, a situational model of security-relevant state for a group of monitored devices. The computing devices may be devices of a remote security service or both devices of a remote security service and an intermediate device.

The process 500 includes, at 502, configuring, by one or more computing devices, a plurality of agents of a corresponding plurality of monitored devices to provide security-relevant information in substantially real-time as execution activities associated with the security-relevant information are observed. In some embodiments, the security-relevant information is information that, when received from a plurality of agents, supports making security decisions.

At 504, the one or more computing devices receive the security-relevant information in substantially real-time and, at 506, build a situational model from the security-relevant information in substantially real-time as the security-relevant information is received, the situational model representing states of the monitored devices. The states include at least current states of the monitored devices.

At 508, the one or more computing devices enable queries of the situational model by a user or by other modules of the remote security service. In response to receiving a query, the one or more computing devices may perform at least one of actions 510-514. At 510, the one or more computing devices may validate state information for the monitored devices based at least in part on results of the queries. At 512, the one or more computing devices may perform at least one security response action based on at least on part on results of the queries. At 514, the one or more computing devices may update agent configurations based at least in part on results of the queries and repeat the configuring based at least in part on the updated agent configurations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more hardware processors;
a memory device coupled to the one or more hardware processors;
a kernel-level security agent stored in the memory device;
a database stored in the memory device, the database configured to store:
security-relevant information that represents at least one state of the system, wherein different portions of the security-relevant information are written to the database during different epochs that each begin with one of: (1) a system boot; (2) a restart of the kernel-level security agent, or (3) an end of rundown on an initial installation of the kernel-level security agent; and
metadata that defines a trusted time period for each portion of the security-relevant information, the trusted time period for a particular portion of the security-relevant information including an epoch during which the particular portion of the security-relevant information is trusted as accurate,
wherein the kernel-level security agent comprises one or more instructions implemented at kernel-level and executed by the one or more hardware processors to cause the one or more hardware processors to perform operations comprising:
during a first epoch, storing a first portion of the security-relevant information related to a first ephemeral object into the database in real-time as first execution activities associated with the first ephemeral object are observed, and indicating in the metadata that the first epoch is the trusted time period for the first portion of the security-relevant information, the first epoch beginning with one of: (1) the system boot; (2) the restart of the kernel-level security agent, or (3) the end of rundown on the initial installation of the kernel-level security agent;
during a second epoch different from the first epoch, storing a second portion of the security-relevant information related to a second ephemeral object into the database in real-time as second execution activities associated with the second ephemeral object are observed, and indicating in the metadata that the second epoch is the trusted time period for the second portion of the security-relevant information, the second epoch beginning with a different one from the first epoch of: (1) the system boot; or (2) the restart of the kernel-level security agent;
determining information of a chain of execution based at least in part on the first portion of the security-relevant information and based at least in part on the second portion of the security-relevant information, wherein the information of the chain of execution comprises at least one of:
information of a process; or
information of a file; and
pruning security-relevant information from the database based at least in part on:
an age and a type of the security-relevant information; or
a prioritization of different categories of the security-relevant information.

2. The system of claim 1, wherein the trusted time period defined by the metadata applies to all data acquired about a collection of security-relevant information that includes the security-relevant information, and wherein being trusted as accurate indicates that the collection of security-relevant information has consistent properties of liveness and trustworthiness.

3. The system of claim 1, the operations further comprising receiving at least the first portion or the second portion.

4. The system of claim 3, the operations further comprising validating state information associated with the execution activities of the system.

5. The system of claim 3, the operations further comprising generating events based on at least the first portion or the second portion and on security-relevant information stored in the database.

6. The system of claim 1, the one or more instructions further comprising a query interface that enables at least one of the one or more instructions to access security-relevant information stored in the database, the query interface further enabling the at least one of the one or more instructions to specify a level of desired trustworthiness associated with metadata that corresponds to security-relevant information stored in the database.

7. The system of claim 1, wherein the pruning procedure first prunes the security-relevant information based on the age and the type and then, when a size of a pruned situational model exceeds a limit, prunes the security-relevant information based on the prioritization of different categories.

8. The system of claim 1, wherein the database comprises a schema that is dynamically configurable by a remote security service.

9. The system of claim 1, wherein the database is further configured to cache at least one of information received from a remote security service, information that is computationally expensive to generate or fetch, or information that is high-latency to fetch.

10. The system of claim 1, the operations further comprising determining at least some of the security-relevant information based on a configuration received from a remote security service.

11. The system of claim 1, the operations further comprising validating state information associated with the execution activities of the system.

12. The system of claim 1, the operations further comprising providing at least some of the security-relevant information to a remote security service.

13. The system of claim 1, wherein the operations to determine the information of the chain of execution include retrieving the first portion of the security-relevant information from the database when the first portion of the security-relevant information is no longer present on a host operating system of the system.

14. The system of claim 6, the operations further comprising:
    determining, by the at least one of the one or more instructions, a query for at least a portion of the security-relevant information, wherein the query specifies at least one of the first epoch or the second epoch as a trust period;
    requesting, by the at least one of the one or more instructions, security information matching the query via the query interface; and
    providing, by the query interface, the portion of the security-relevant information.

15. A method comprising:
    receiving, by a kernel-level security agent of a computing device, a notification of an event associated with execution activities of the computing device;
    querying, by the kernel-level security agent, a situational model for security-relevant information based at least in part on the notification, the security-relevant information representing a first state of the computing device during a first epoch, wherein the first epoch begins with one of: (1) a system boot; (2) a restart of the kernel-level security agent, or (3) an end of rundown on an initial installation of the kernel-level security agent;
    validating, by the kernel-level security agent, state information associated with the event based at least in part on the security-relevant information to provide a validation result, wherein the state information represents a second state of the computing device during a second epoch, and the validating includes comparing at least a part of the state information with at least a part of the security-relevant information, wherein the second epoch begins with a different one, from the first epoch, of: (1) the system boot; or (2) the restart of the kernel-level security agent;
    in response to the validation result being a validation error, performing, by the computing device, at least one security response action, wherein the security response action comprises:
        reporting the validation error to a remote security service;
        monitoring further execution activities;
        taking a remediation action directed at malicious activity that is responsible for the validation error; or
        alerting a user of the computing device; and
    pruning at least some of the security-relevant information based at least in part on an age and a type of the at least some of the security-relevant information or a prioritization of different categories of the at least some of the security-relevant information.

16. The method of claim 15, further comprising, before the validating, determining, by the computing device, that the state information is fully maintained in the situational model.

17. The method of claim 15, further comprising retrieving, by the computing device, the security-relevant information from a database when the security-relevant information is no longer present on a host operating system of the computing device.

18. The method of claim 15, the security-relevant information further indicating whether the first epoch reaches back to at least one of a reboot or a mounting of a file system.

19. One or more non-transitory computer-readable media having stored thereon computer-executable instructions configured to program one or more computing devices to perform operations comprising:
    configuring a plurality of kernel-level security agents of a corresponding plurality of monitored computing devices to provide security-relevant information in real-time as execution activities associated with the security-relevant information are observed, wherein:
        the monitored computing devices are each separate and distinct computing devices from each other,
        the monitored computing devices include a first computing device,
        the plurality of kernel-level security agents includes a first kernel-level security agent corresponding to the first computing device,
        the configuring includes configuring the first kernel-level security agent to provide first-device security-relevant information of the security-relevant information; and
        the first-device security-relevant information comprises a first portion relating to a first ephemeral object during a first epoch and a second portion relating to a second ephemeral object during a second epoch;
    receiving the security-relevant information in real-time from at least the first kernel-level security agent;
    building a situational model from the security-relevant information in real-time as the security-relevant information is received, wherein:
        the situational model represents states of the monitored computing devices; and
        the represented states include at least:
            a first state corresponding to the first computing device and to the first epoch; and
            a second state corresponding to the first computing device and to the second epoch;
    building a device-specific situational model of the first computing device from the first portion and the second portion of the security-relevant information in real-time as the first-device security-relevant information is received from the first kernel-level security agent, wherein:
the device-specific situational model represents states of the first computing device; and
the represented states of the first computing device include at least a third state corresponding to the first epoch and a fourth state corresponding to the second epoch, wherein the first epoch begins with one of: (1) a system boot of the first computing device; (2) a restart of the first kernel-level security agent; or (3) an end of rundown on an initial installation of a first security agent, and the second epoch begins with a different one, from the first epoch, of: (1) the system boot of the first computing device; or (2) the restart of the kernel-level security agent;
after at least one of the building the situational model or the building the device-specific situational model, receiving queries of at least one of the situational model or the device-specific situational model from at least one of a user or a security service; and
pruning at least some of the security-relevant information based at least in part on an age and a type of the at least some of the security-relevant information or a prioritization of different categories of the at least some of the security-relevant information.

20. The one or more non-transitory computer-readable media of claim 19, wherein the one or more computing devices include one or more computing devices implementing a security service and an intermediate device, the one or more computing devices implementing a security service performing the configuring and the intermediate device performing the receiving and the building.

21. The one or more non-transitory computer-readable media of claim 19, wherein the security-relevant information is information that, when received from a plurality of agents, supports making security decisions.

22. The one or more non-transitory computer-readable media of claim 19, wherein the represented states include at least current state(s) of at least one of the monitored computing devices.

23. The one or more non-transitory computer-readable media of claim 19, wherein the operations further comprise validating state information for the monitored computing devices based at least in part on results of the queries.

24. The one or more non-transitory computer-readable media of claim 19, wherein the operations further comprise performing at least one security response action based on at least on part on results of the queries.

25. The one or more non-transitory computer-readable media of claim 19, wherein the operations further comprise updating agent configurations based at least in part on results of the queries and repeating the configuring based at least in part on the updated agent configurations.

26. The one or more non-transitory computer-readable media of claim 19, wherein the operations further comprise, in response to the receiving queries, retrieving at least the first portion of the security-relevant information from the situational model or the device-specific situational model for the first computing device when the first portion is no longer present on a host operating system of the first computing device.

27. The one or more non-transitory computer-readable media of claim 19, wherein:
a query of the queries specifies at least one of the first epoch or the second epoch as a trust period; and
the operations further comprise, in response to the query, providing results associated with the query, the results indicating whether or not all of the results are within the trust period.

* * * * *